United States Patent
Angiolillo et al.

(10) Patent No.: US 9,143,735 B2
(45) Date of Patent: Sep. 22, 2015

(54) SYSTEMS AND METHODS FOR PROVIDING A PERSONAL CHANNEL VIA TELEVISION

(75) Inventors: Joel S. Angiolillo, Weston, MA (US); Xi Zhang, Newton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1851 days.

(21) Appl. No.: 11/356,094

(22) Filed: Feb. 17, 2006

(65) Prior Publication Data

US 2007/0199019 A1    Aug. 23, 2007

(51) Int. Cl.
| | |
|---|---|
| H04N 7/173 | (2011.01) |
| H04N 21/258 | (2011.01) |
| H04N 21/2668 | (2011.01) |
| H04N 21/2743 | (2011.01) |
| H04N 21/4223 | (2011.01) |
| H04N 21/472 | (2011.01) |
| H04N 21/6334 | (2011.01) |
| H04N 21/658 | (2011.01) |

(52) U.S. Cl.
CPC ..... *H04N 7/17318* (2013.01); *H04N 21/25816* (2013.01); *H04N 21/2668* (2013.01); *H04N 21/2743* (2013.01); *H04N 21/4223* (2013.01); *H04N 21/47202* (2013.01); *H04N 21/6334* (2013.01); *H04N 21/6581* (2013.01)

(58) Field of Classification Search
USPC ............... 725/32, 37, 131–132, 139–140, 725/151–152, 38, 44, 47, 105
See application file for complete search history.

(56) References Cited

U.S. PATENT DOCUMENTS

| | | | |
|---|---|---|---|
| 4,918,603 A | | 4/1990 | Hughes et al. |
| 5,018,736 A | | 5/1991 | Pearson et al. |
| 5,155,591 A | | 10/1992 | Wachob |
| 5,846,132 A | | 12/1998 | Junkin |
| 5,860,862 A | | 1/1999 | Junkin |
| 5,945,987 A | * | 8/1999 | Dunn ............................ 715/718 |

(Continued)

FOREIGN PATENT DOCUMENTS

| | | |
|---|---|---|
| CN | 1517930 | 8/2004 |
| EP | 1489800 EP | 12/2004 |

(Continued)

OTHER PUBLICATIONS

International Search Report and Written Opinion dated Jul. 28, 2008 issued for international application No. PCT/US07/03908, 11 pages.

(Continued)

*Primary Examiner* — Ngoc Vu

(57) ABSTRACT

Preferred systems and methods provide a personal channel for broadcasting personal content to televisions over a network, such as a fiber optic access network. A service provider assigns a personal channel identifier to a broadcaster. This identifier allows viewers to tune to the personal channel. The broadcaster sends personal content to the service provider together with a list of authorized viewers for that personal content. The service provider stores the personal content and makes it available as specified by the subscriber for viewing. When requested, the service provider sends the personal content to the specified set top boxes on the assigned personal channel identifier. By tuning the set top box to the broadcaster's channel, viewers may view the personal content on television as though it were broadcast from any network television station.

20 Claims, 9 Drawing Sheets

(56) References Cited

U.S. PATENT DOCUMENTS

| | | | |
|---|---|---|---|
| 5,971,854 A | 10/1999 | Pearson et al. | |
| 6,009,355 A | 12/1999 | Obradovich et al. | |
| 6,081,830 A | 6/2000 | Schindler | |
| 6,165,071 A | 12/2000 | Weiss | |
| 6,193,610 B1 | 2/2001 | Junkin | |
| 6,280,323 B1 | 8/2001 | Yamazaki et al. | |
| 6,324,694 B1 | 11/2001 | Watts et al. | |
| 6,371,855 B1 | 4/2002 | Gavriloff | |
| 6,442,598 B1 | 8/2002 | Wright et al. | |
| 6,565,084 B1 | 5/2003 | Katz et al. | |
| 6,669,565 B2 | 12/2003 | Liegey | |
| 6,688,978 B1 | 2/2004 | Herman | |
| 6,733,383 B2 | 5/2004 | Busse et al. | |
| 6,749,198 B2 | 6/2004 | Katz et al. | |
| 6,760,595 B2 | 7/2004 | Inselberg | |
| 6,773,350 B2 | 8/2004 | Yoshimi et al. | |
| 6,774,926 B1* | 8/2004 | Ellis et al. | 348/14.01 |
| RE38,600 E | 9/2004 | Mankovitz | |
| 6,811,484 B2 | 11/2004 | Katz et al. | |
| 7,001,279 B1 | 2/2006 | Barber et al. | |
| 7,006,616 B1 | 2/2006 | Christofferson et al. | |
| 7,120,871 B1 | 10/2006 | Harrington | |
| 7,123,930 B2 | 10/2006 | Inselberg | |
| 7,159,235 B2 | 1/2007 | Son et al. | |
| 7,178,158 B2 | 2/2007 | Nishina et al. | |
| 7,243,139 B2 | 7/2007 | Ullman et al. | |
| 7,294,776 B2 | 11/2007 | Tohgi et al. | |
| 7,298,831 B1 | 11/2007 | Keohane et al. | |
| 7,346,556 B2 | 3/2008 | Upendran et al. | |
| 7,409,437 B2 | 8/2008 | Ullman et al. | |
| 7,631,327 B2 | 12/2009 | Dempski et al. | |
| 7,669,219 B2 | 2/2010 | Scott, III | |
| 2002/0059621 A1 | 5/2002 | Thomas et al. | |
| 2002/0089610 A1 | 7/2002 | Ohno et al. | |
| 2002/0138843 A1* | 9/2002 | Samaan et al. | 725/87 |
| 2002/0142842 A1 | 10/2002 | Easley et al. | |
| 2002/0144273 A1 | 10/2002 | Reto | |
| 2002/0157099 A1 | 10/2002 | Schrader et al. | |
| 2002/0157101 A1 | 10/2002 | Schrader et al. | |
| 2002/0166123 A1 | 11/2002 | Schrader et al. | |
| 2003/0002849 A1 | 1/2003 | Lord | |
| 2003/0005446 A1 | 1/2003 | Jaff et al. | |
| 2003/0028892 A1 | 2/2003 | Gewickey et al. | |
| 2003/0172375 A1 | 9/2003 | Shaw et al. | |
| 2003/0182663 A1 | 9/2003 | Gudorf et al. | |
| 2003/0191816 A1* | 10/2003 | Landress et al. | 709/219 |
| 2003/0229900 A1 | 12/2003 | Reisman | |
| 2004/0017396 A1 | 1/2004 | Werndorfer et al. | |
| 2004/0019912 A1 | 1/2004 | Staack | |
| 2004/0031058 A1 | 2/2004 | Reisman | |
| 2004/0117852 A1 | 6/2004 | Karaoguz et al. | |
| 2004/0139233 A1 | 7/2004 | Kellerman et al. | |
| 2004/0159215 A1 | 8/2004 | Tohgi et al. | |
| 2004/0168187 A1 | 8/2004 | Chang | |
| 2004/0194137 A1 | 9/2004 | Shreesha | |
| 2004/0198495 A1 | 10/2004 | Cisneros | |
| 2004/0231003 A1 | 11/2004 | Cooper et al. | |
| 2004/0261106 A1 | 12/2004 | Hoffman | |
| 2005/0028208 A1 | 2/2005 | Ellis et al. | |
| 2005/0066362 A1 | 3/2005 | Rambo | |
| 2005/0066364 A1 | 3/2005 | Rambo | |
| 2005/0076362 A1 | 4/2005 | Dukes et al. | |
| 2005/0086358 A1 | 4/2005 | Rosenberg | |
| 2005/0091694 A1 | 4/2005 | Rambo | |
| 2005/0108767 A1 | 5/2005 | Ma | |
| 2005/0227676 A1 | 10/2005 | De Vries | |
| 2005/0246457 A1 | 11/2005 | Parry et al. | |
| 2005/0246757 A1 | 11/2005 | Relan et al. | |
| 2005/0262542 A1 | 11/2005 | DeWeese et al. | |
| 2006/0015745 A1 | 1/2006 | Sukigara et al. | |
| 2006/0039361 A1 | 2/2006 | Ohno et al. | |
| 2006/0123455 A1 | 6/2006 | Pai et al. | |
| 2006/0137015 A1 | 6/2006 | Fahrny et al. | |
| 2006/0183547 A1 | 8/2006 | McMonigle | |
| 2007/0028287 A1 | 2/2007 | Yamamoto et al. | |
| 2007/0060380 A1 | 3/2007 | McMonigle et al. | |
| 2007/0061837 A1* | 3/2007 | Dadush | 725/34 |
| 2007/0107019 A1 | 5/2007 | Romano et al. | |
| 2007/0115845 A1 | 5/2007 | Hochwarth et al. | |
| 2007/0124795 A1 | 5/2007 | McKissick et al. | |
| 2007/0129123 A1 | 6/2007 | Eryou et al. | |
| 2007/0157281 A1 | 7/2007 | Ellis et al. | |
| 2007/0198738 A1 | 8/2007 | Angiolillo et al. | |
| 2007/0199018 A1 | 8/2007 | Angiolillo et al. | |
| 2007/0199019 A1 | 8/2007 | Angiolillo et al. | |
| 2007/0199025 A1 | 8/2007 | Angiolillo et al. | |
| 2007/0204308 A1 | 8/2007 | Nicholas et al. | |
| 2008/0140406 A1 | 6/2008 | Burazerovic et al. | |
| 2008/0141303 A1 | 6/2008 | Walker et al. | |
| 2011/0107220 A1 | 5/2011 | Perlman | |

FOREIGN PATENT DOCUMENTS

| | | |
|---|---|---|
| GB | 2405018 | 2/2005 |
| KR | 20040034891 | 4/2004 |
| WO | 01/46818 | 6/2001 |
| WO | 02/19701 | 3/2002 |
| WO | WO-02/102079 | 12/2002 |
| WO | WO-2005/003899 | 1/2005 |
| WO | WO 2006/012788 | 2/2006 |

OTHER PUBLICATIONS

Written Opinion Dated Aug. 25, 2008 issued for international application No. PCT/US07/03907, 5 pages.

Written Opinion Dated Dec. 13, 2007 issued for international application No. PCT/US07/03909, 4 pages.

Regan, Tim et al., "Media Center Buddies: Instant Messaging Around a Media Center," Technical Report MSR-TR-2004-47, Microsoft Research, Jun. 2, 2004, p. 1-9.

PCT International Search Report and Written Opinion in PCT Application No. PCT/US07/03909 Dec. 13, 2007.

Michael, Bill and Jainschigg, John, "Instant Messaging," Call Center, Jan. 5, 2001, <http://www.cconvergence.com/GLOBAL/stg/commweb_shared/shared/article/showArticle.jhtml?articleId=8700996& pgno=1>, (4 pages).

"Instant Messaging and Presence," SIP Showcase, accessed Oct. 27, 2005, <http://www.sipcenter.com/sip.nsf/html/Instant+Messaging+and+Presence>, (2 pages).

Regan, Tim and Todd, Ian, "Media Center Buddies: Instant Messaging around a Media Center ," Technical Report MSR-TR-2004-47, Microsoft Research, Jun. 2, 2004, <http://research.microsoft.com/research/pubs/view.aspx?type=Technical%20Report&id=751> (9 pages).

"Comcast and Microsoft Announce Agreement to Trial Microsoft TV Software ," Microsoft TV Press Release, Jul. 21, 2003, <http://www.microsoft.com/tv/content/PressReleases/MSTVComcastPR.mspx> (2 pages).

"AINGR: Switch—Service Control Point(SCP)/Adjunct Interface," Telcordia Technologies Generic Requirements GR-1299-CORE, Issue 7, Nov. 2001, (542 pages).

"AINGR: Switching Systems," Telcordia Technologies Generic Requirements GR-1298-CORE, Issue 7, Nov. 2001, (2206 pages).

Handley, M., Schulzrinne, H., Schooler, E., and Rosenberg, J., "RFC 2543—SIP: Session Initiation Protocol," The Internet Society, Mar. 1999, (132 pages).

Rosenberg, J., "RFC 3856—A Presence Event Package for the Session Initiation Protocol (SIP)," The Internent Society, Aug. 2004, (25 pages).

Fujimoto, S., Sugano, H., Klyne, G., Bateman, A., Carr, W., and Peterson, J., "RFC 3863—Presence Information Data Format (PIDF)," The Internet Society, Aug. 2004, (31 pages).

"Fantasy Sports Trade Association" <http://www.fsta.org/index.shtml> (accessed Aug. 26, 2005).

Batts, Battino, "Sports Fans become CEOs in Multibillion-Dollar Fantasy Leagues," Virginian-Pilot, Knight Ridder/Tribune Business Review, Sep. 26, 2004.

"Fantasy Sports is our Undiscovered Game," Jul. 28, 2004, <http://www.electronicgamingbusiness.com>.

(56) References Cited

OTHER PUBLICATIONS

Tedeschi, Bob, "Advertisers Discover the Value of Young Men with Time and Money to Spend on Fantasy Sports on the Web," New York Times, Aug. 23, 2004, p. C7.
Kessler, Scott, "Hot Players in Online Gaming," Business Week Online, May 24, 2004, <http://www.businessweek.com/investor/content/may2004/pi20040524_2927_pi044.htm>.
Hurtt, Rob, "Get in the Game: Think You Know Football? Put it to Use. Fantasy Leagues Have Something to Offer Every Fan, Even Old-Schoolers," The Sporting News, Aug. 30, 2004.
Wendel, Tim, "How Fantasy Games Have Changed Fans," USA Today, <http://www.usatoday.com/news/opinion/editorials> (posted Sep. 19, 2004).
Delaney, Kevin, "Fantasy Sports Lures AOL, Electronic Arts as More Fans Join In", Wall Street Journal, Sep. 9, 2004, p. B1.
Arthur, Bruce, "It's Fantasy-astic: Fantasy Football has Become a Monster in North America, Which Explains My Sudden Interest in Guys Named Morten," National Post, Toronto Edition, Sep. 27, 2004, p. S2.
Levy, Paul, "The Teams Aren't Real, but Money Is: Fantasy Sports have Caught Corporations' Attention," Minneapolis Star Tribune, Aug. 29, 2004, p. 1A.
Hoffarth, Tom, "Fantasy Football is TV's Reality," The Daily News of Los Angeles, Sep. 10, 2004, p. S2.
Warley, Stephen, "Sports iTV: The Sporting News," Oct. 23, 2002, <http://www.tvspy.com/nexttv/nexttvcolumn.cfm?t_nexttv_id=581&page=1&t_content_cat_id=10>.
Page from www.tivo.com/4.9.5.asp for Digital Photo Viewer Printed Aug. 16, 2005 (1 page).
Page from www.snapfish.com for Snapfish Printed Aug. 16, 2005 (1 page).
Page from www.ofoto.com for Kodak EasyShare Gallery Printed Aug. 16, 2005 (1 page).
Page from http://photos.yahoo.com for Yahoo! Photos Printed Aug. 16, 2005 (1 page).
"Microsoft TV Photo Viewer Provides a Simple New Way to View Digital Photos on Home Television Sets." www.microsoft.com/presspass/features/2001/Sep01/09-20tvphotoviewer.mspx Printed Aug. 16, 2005 (2 pages).
"Interactive TV stuck in zip?" Printed Aug. 25, 2005 from http://www.mediaweek.co.uk/articles/2004/7/20/InteractiveTVstuckinzip (4 pages).
"That Wonderful Honda Ad" Printed on Aug. 25, 2005 from http://battellemedia.com/archives/000131/.php (6 pages).
"Welcome to the Honda Multimedia" Printed on Aug. 25, 2005 from http://www.honda.co.uk/multimedia/ (1 page).
"Honda Interactive TV Campaign to Explain New IMA Technology" Printed Aug. 25, 2005 from http://www.e-consultancy.com/about/press.asp?id=166 (3 pages).
"Zip TV Debuts With Interactive Content for Honda Campaign" Printed on Aug. 25, 2005 from http://www.aiada.org/article.asp?id=20603 (2 pages).
"Interactive TV Advertising: Turning Viewers Into Direct Leads Without A Set-Top Box" (4 pages). Printed Aug. 25, 2005 from http://www.broadcastpapers.com/data/IKSInteractiveTV02.htm.
Tawani et al., "Context Aware Personalized Ad Insertion an Interactive TV Environment" (6 pages). Satyam Computer Services Limited. Printed Aug. 25, 2005 from http://www.di.unito.it/~liliana/TV04/FINAL/thawani.pdf.
"Wink Communications Launching Interactive TV Commercials" (4 pages). Printed Aug. 31, 2005 from www.clickz.com/news/article/pp/16761.
"ZIP TV Channel Launches with Exclusive Honda Video" (24 pages) Printed Aug. 31, 2005 from www.immediatefuture.co.uk/296.
"BBC, Channel 4 and ITV to Extend Audio Description Service," Jun. 21, 2004, http://www.bbc.co.uk/pressoffice/pressreleases/stories/2004/06_june21/audio.shtml, (2 pages).
"Audio Descriptions," Newsletter for Apr. 2004, <http://www.eabnet.org.uk/knowitall/finally/teabreak/newsletters/April/April2004.htm> (accessed Jul. 5, 2005), (4 pages).
"TV for the Blind—New Audio Description Tool Changes TV Experience," Netgem Press Release, Jan. 13, 2004, <http://www.netgemdirect.com/files/homepage/tvfortheblind>, (2 pages).
Netgem i-Player AD, <http://www.netgemdirect.com/default.asp?action=produit&id_prod=5> (accessed Jul. 6, 2005), (1 page).
"Five to Use BskyB's Audio Description Technology," British Sky Broadcasting Group Press Release, Nov. 18, 2003, <http://www1.sky.com/disability/release2.htm>, (2 pages).
"An Introduction to Screen Readers," Printed Jul. 19, 2007, from http://web.archive.org/web/20040404135336/http://mason.gmu.edu/~swidmaye/portfolio/edit797assistivetec h.htm (5 pages).
Speir, Michelle, "Screen Readers Open Windows for the Blind," Printed Jul. 19, 2007, from http://www.fcw.com/fcw/articles/2000/0807/cov-access3-08-07-00.asp. (3 pages).
"Alternative Web Browsing," Printed Jul. 19, 2007, from http://www.w3.org/WAI/References/Browsing.html. (4 pages).
PCT International Search Report and Written Opinion in PCT Application No. PCT/US07/03910, Filed Dec. 12, 2007.
Unpublished U.S. Appl. No. 11/356,090, filed Feb. 17, 2006.
Unpublished U.S. Appl. No. 11/356,053, filed Feb. 17, 2006.
Unpublished U.S. Appl. No. 11/356,052, filed Feb. 17, 2006.
"The American Heritage College Dictionary," Fourth Edition, Houghton Mifflin Company, p. 842, Copyright 2002.
Chorianopoulos, "Content-Enriched Communication—Supporting the Social Uses of TV," XP001507678, The Journal of The Communications Network, vol. 6, Part 1, pp. 23-29. Jan.-Mar. 2007.
Graefen, "Mit Samba Wird Aus Linux Ein Stabiler Windows Datei— Und Druckserver," Ntz (Nachrichtentechnische Zeitschrift), XP-000846989, vol. 52, No. 6, pp. 32-33, Jan. 1999.

* cited by examiner

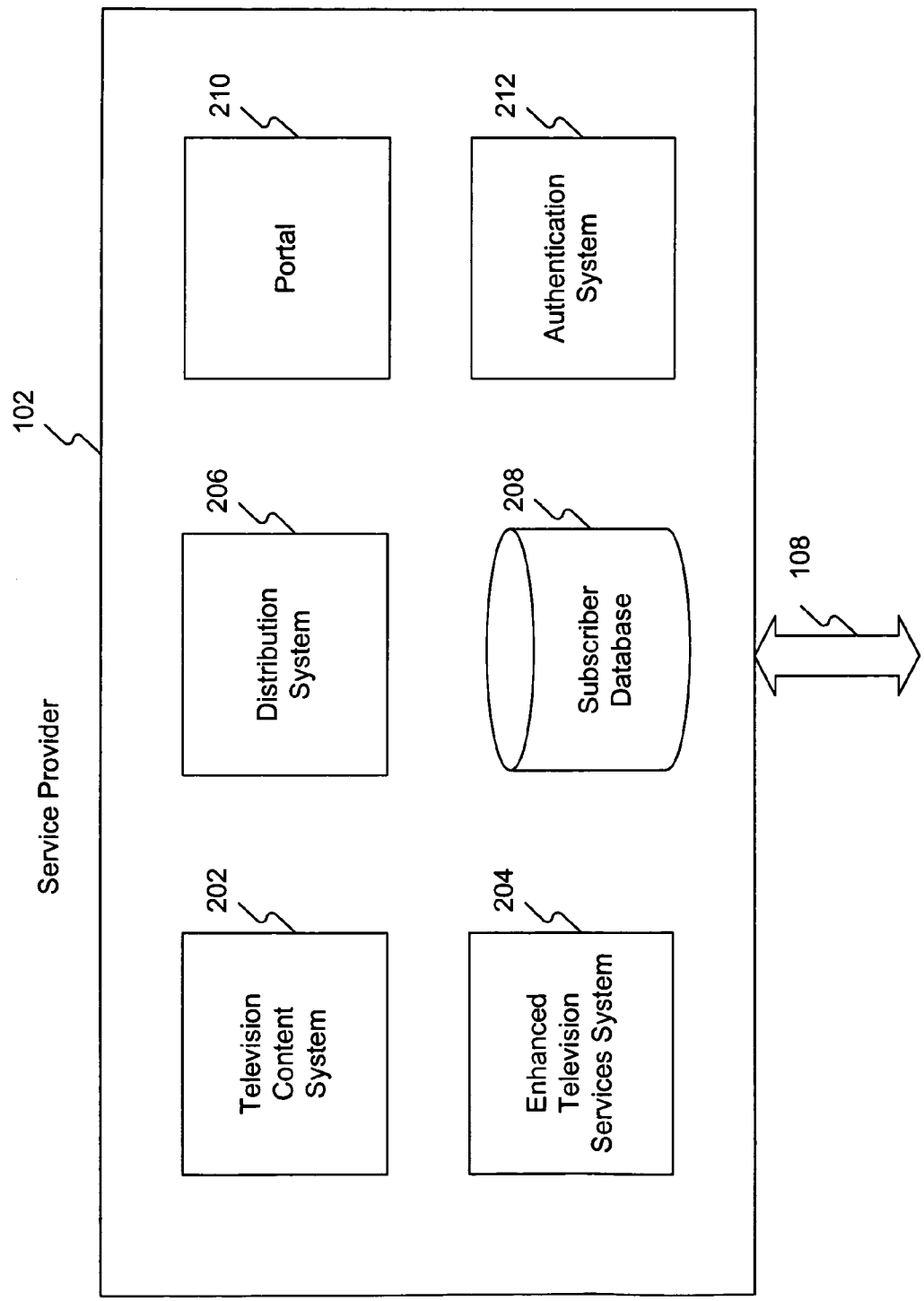

SYSTEMS AND METHODS FOR PROVIDING A PERSONAL CHANNEL VIA TELEVISION

I. RELATED APPLICATIONS

The applications listed below are related to this application and are being filed on the same date as this application:

U.S. patent application Ser. No. 11/356,090, entitled "Systems and Methods for Providing Supplementary Television Content;"

U.S. patent application Ser. No. 11/356,053, entitled "Systems and Methods for Shared Viewing Via Television;"

U.S. patent application Ser. No. 11/356,052, entitled "Systems and Methods for Fantasy League Service Via Television;"

U.S. patent application Ser. No. 11/356,056, entitled "Television Integrated Chat and Presence Systems and Methods;"

U.S. patent application Ser. No. 11/356,092, entitled "Systems and Methods for Providing a Shared Folder via Television;"and U.S. patent application Ser. No. 11/356,091, entitled "Systems and Methods for Voicing Text in an Interactive Programming Guide."

II. TECHNICAL FIELD

The present application is generally directed to communications networks having video transmission capabilities. The embodiments described herein are more specifically directed to systems and methods to receive and transmit enhanced television services over high bandwidth access networks.

III. BACKGROUND INFORMATION

Consumers and businesses today receive television services from a variety of sources. Using even the most basic television set, viewers can receive traditional television broadcasts via an antenna connected to the television set. The problems with traditional broadcast television are well known. To receive a television signal, the receiving antenna must be within the range of a broadcast transmitter, making it difficult to receive a signal in remote places. The quality of a broadcast picture can depend on the strength or position of the antenna, leading to fuzzy pictures and constant repositioning of the antenna. Furthermore, traditional broadcast television is limited to simple viewing. The television signal is received and a picture is displayed on the viewer's television. Aside from changing channels, there is no way for viewers to customize television content or to communicate with broadcasters.

Cable television and, later, satellite television were developed to solve some of the problems associated with traditional broadcast television. Cable television providers receive television content from a variety of programming sources and transmit the content via cables, such as coaxial cables, directly to subscribers' homes. In the home, a "set top box" is typically used to receive the cable signal and provide it to the televisions for display. Although cable television does not generally suffer from the picture quality problems of over-the-air broadcast television, the use of amplifiers to carry the cable signal over long distances can cause signal degradation and reliability problems. The typical cable set top box also offers limited options for customizing content because it relies on standard broadcast television content transmissions, has generally contained limited processing functionality and has limited network interactivity capabilities (e.g., pay-per-view requests, video on demand requests).

Satellite television provides high quality television picture because its signal travels through the air (i.e., a faster and more accurate delivery medium than cable) and it does not rely on an antenna's range to the content provider. Instead, satellite providers broadcast television content to a geosynchronous satellite that rebroadcasts the content to a satellite dish at a subscriber's home. The satellite dish is typically connected to a satellite receiver that decrypts and formats the television content and delivers it to the televisions for display. However, satellite television is not without its limitations. For example, like cable television services, satellite television relies on standard broadcast content transmissions. Furthermore, satellite receivers rely on low-bandwidth conventional "plain old telephone service" (POTS) telephone lines to provide a bi-directional communication path for requests from the satellite receiver and download of customized content, so download rates are slow and available content is limited.

Digital video recorders, available as standalone components or integrated in set top boxes and satellite receivers, enable viewers to record television content. Using a menu displayed on the television, viewers may be able to select programs to be recorded, order pay-per-view content, and set viewing preferences, such as parental controls. However, typical digital video recorders use low-bandwidth POTS phone lines as a bi-directional communication path to a cable, satellite or other service provider, limiting the ability to provide any content customized specifically for a particular user.

Over the years, broadcast, cable, and satellite television have steadily improved television picture quality and some providers have developed the capacity to deliver limited enhancements to video broadcast viewing, such as pay-per-view and video-on-demand. Digital video recorders enable viewers to receive content in a limited and delayed fashion. However, there remains a need for enhanced television services that are rich, reliable, and truly customized.

IV. BRIEF DESCRIPTION OF THE DRAWINGS

FIG. 2 is a detailed block diagram of a service provider consistent with an embodiment of the present invention;

Figure 4:
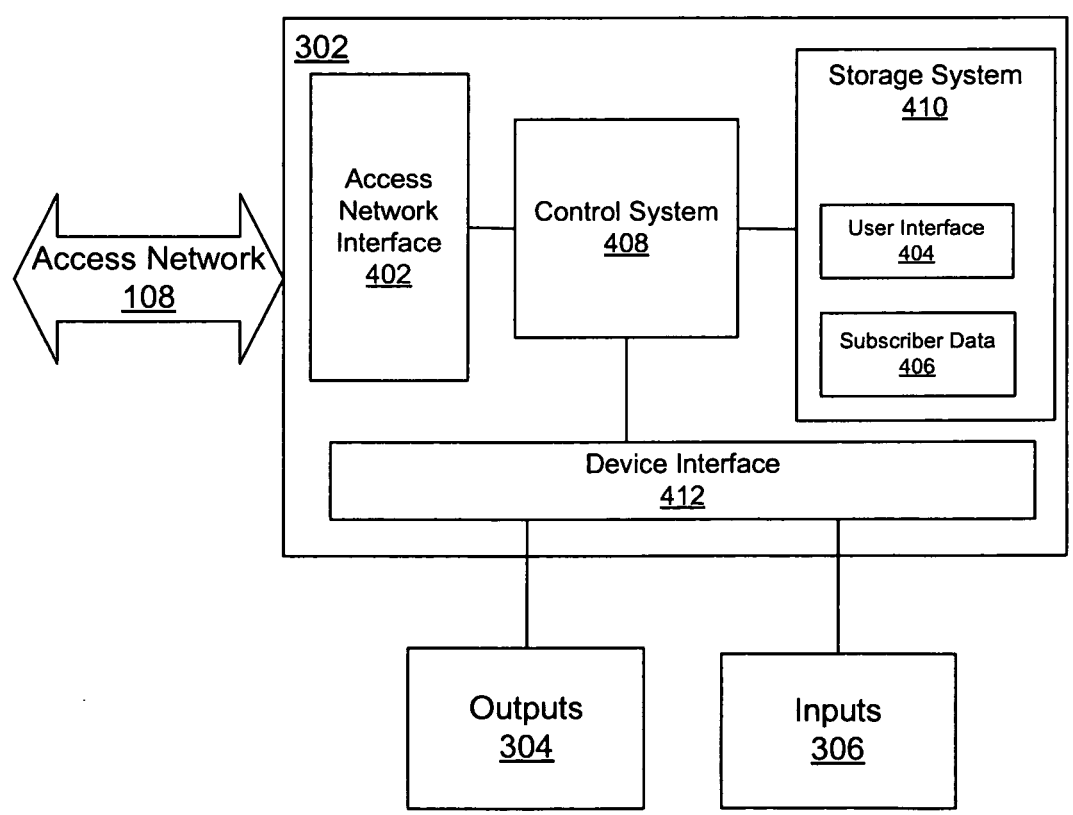
Figure 5:
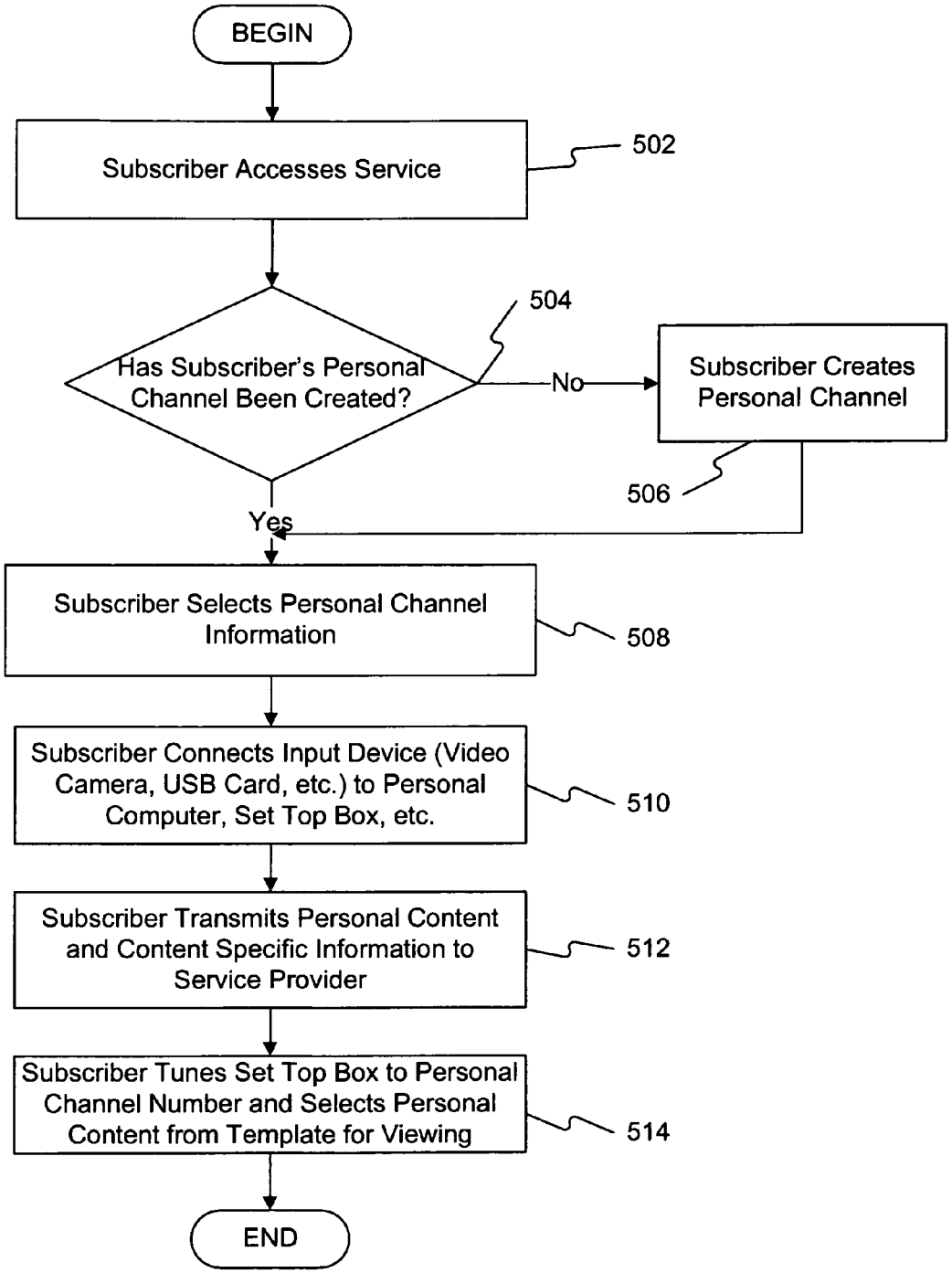
Figure 6:
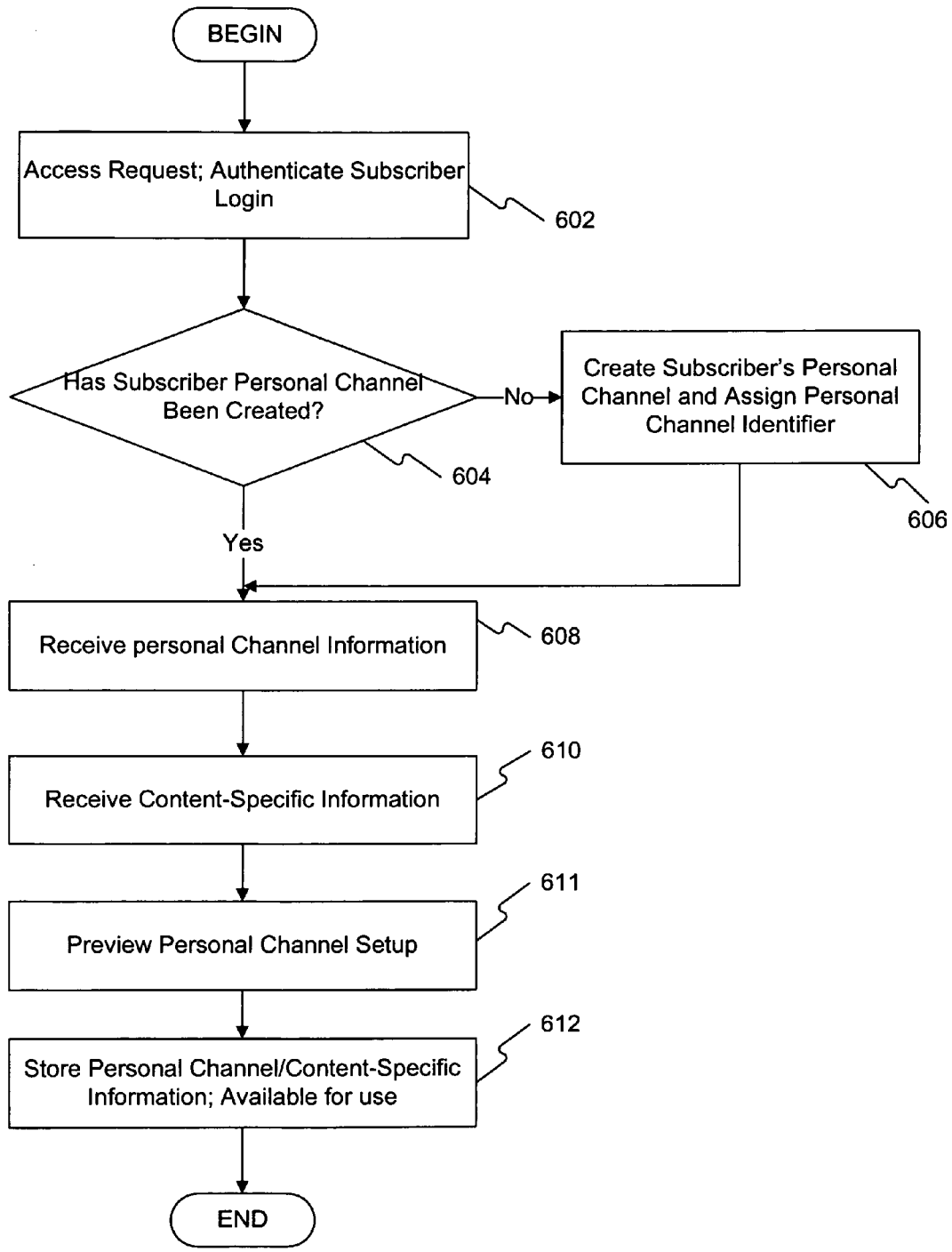
Figure 7:
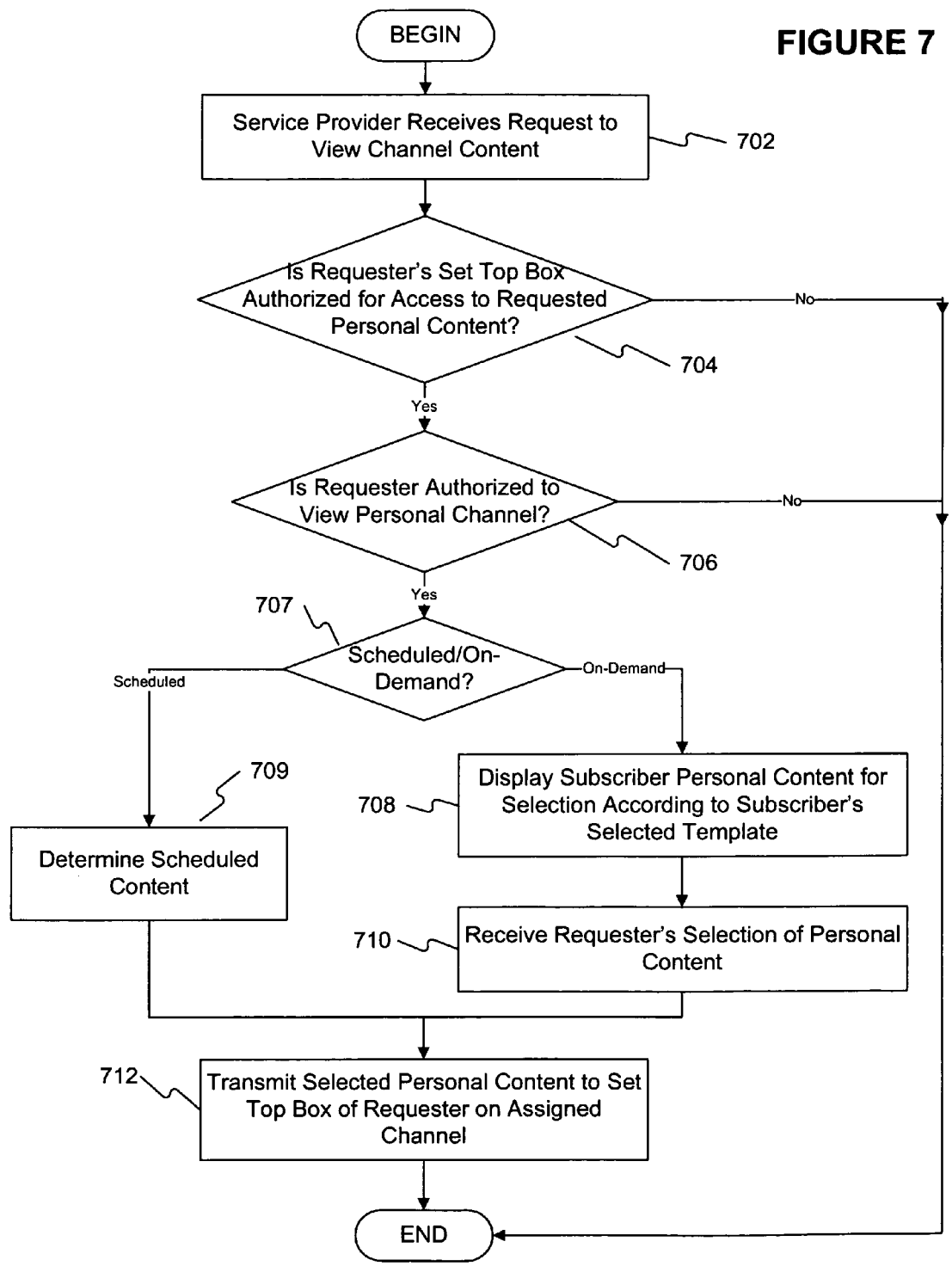
Figure 8:
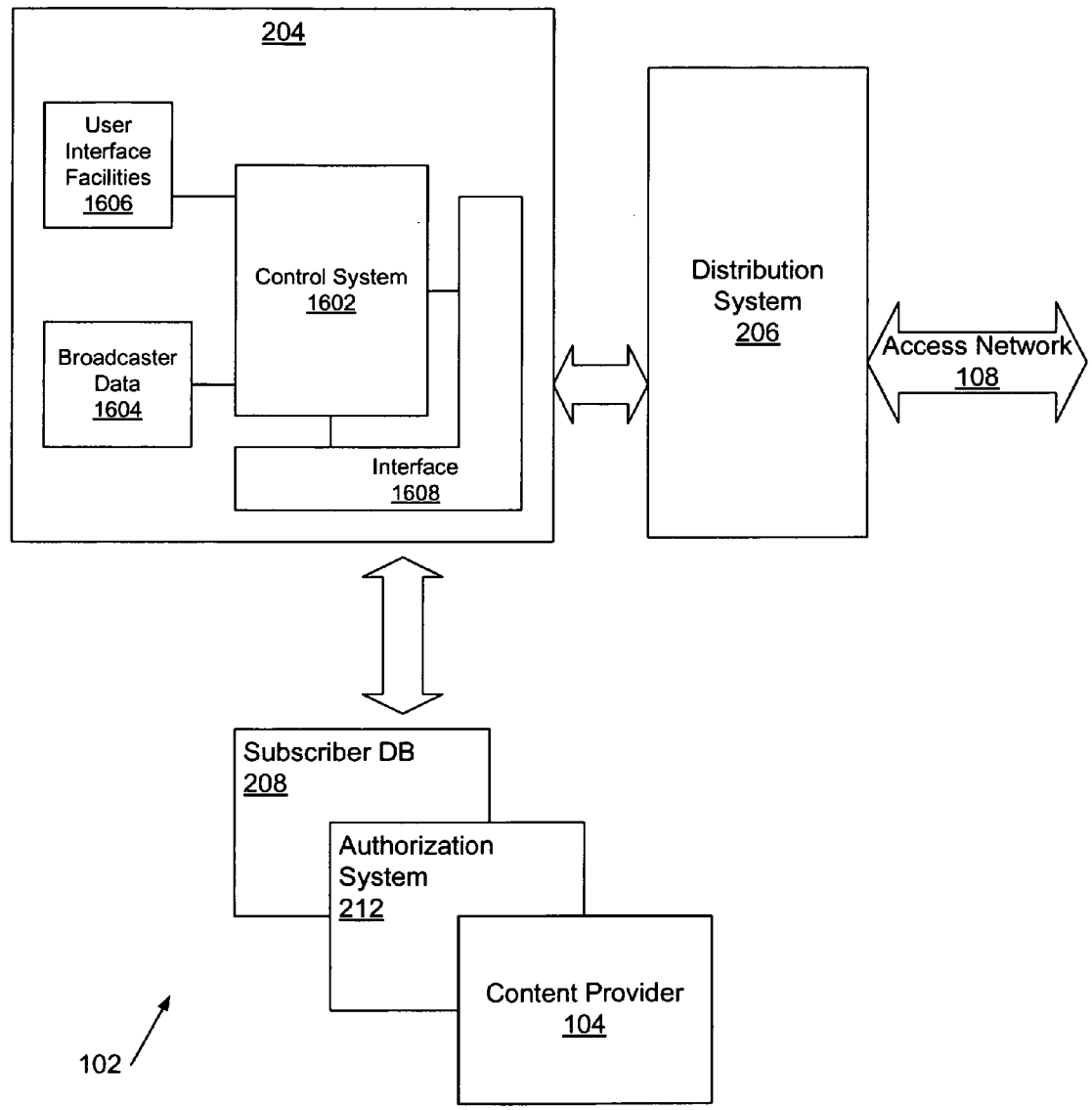

FIGS. 3(*a*) and 3(*b*) are detailed block diagrams of a subscriber, consistent with an embodiment of the present invention;

FIG. 4 is a detailed block diagram of a network terminal consistent with an embodiment of the present invention;

FIG. 5 is a flow chart of an exemplary method for providing a personal channel service to subscribers, consistent with an embodiment of the present invention;

FIG. 6 is a flow chart depicting a method to set up and manage a personal channel via television, consistent with an embodiment of the present invention;

FIG. 7 provides a flow chart of an example of a method of providing personal content from a broadcaster's personal channel, consistent with an embodiment of the present invention; and FIG. 8 is a detailed block diagram of an enhanced television services system implementing a personal channel service, consistent with an embodiment of the present invention.

V. DETAILED DESCRIPTION OF PREFERRED EMBODIMENTS

Preferred methods and systems consistent with the present invention provide enhanced television services to subscribers using a high speed bi-directional connection such as a fiber optic network. A service provider transmits both general television content, such as broadcast television programs, and content that is customized for each subscriber. Subscribers communicate with the service provider to perform any number of tasks, including establishing an account, ordering customized content, and sharing content with other subscribers.

Reference will now be made in detail to various exemplary embodiments implemented according to the invention, examples of which are illustrated in the accompanying drawings. Wherever possible, the same reference numbers will be used throughout the drawings to refer to the same or like parts.

A. System Overview

Figure 1:
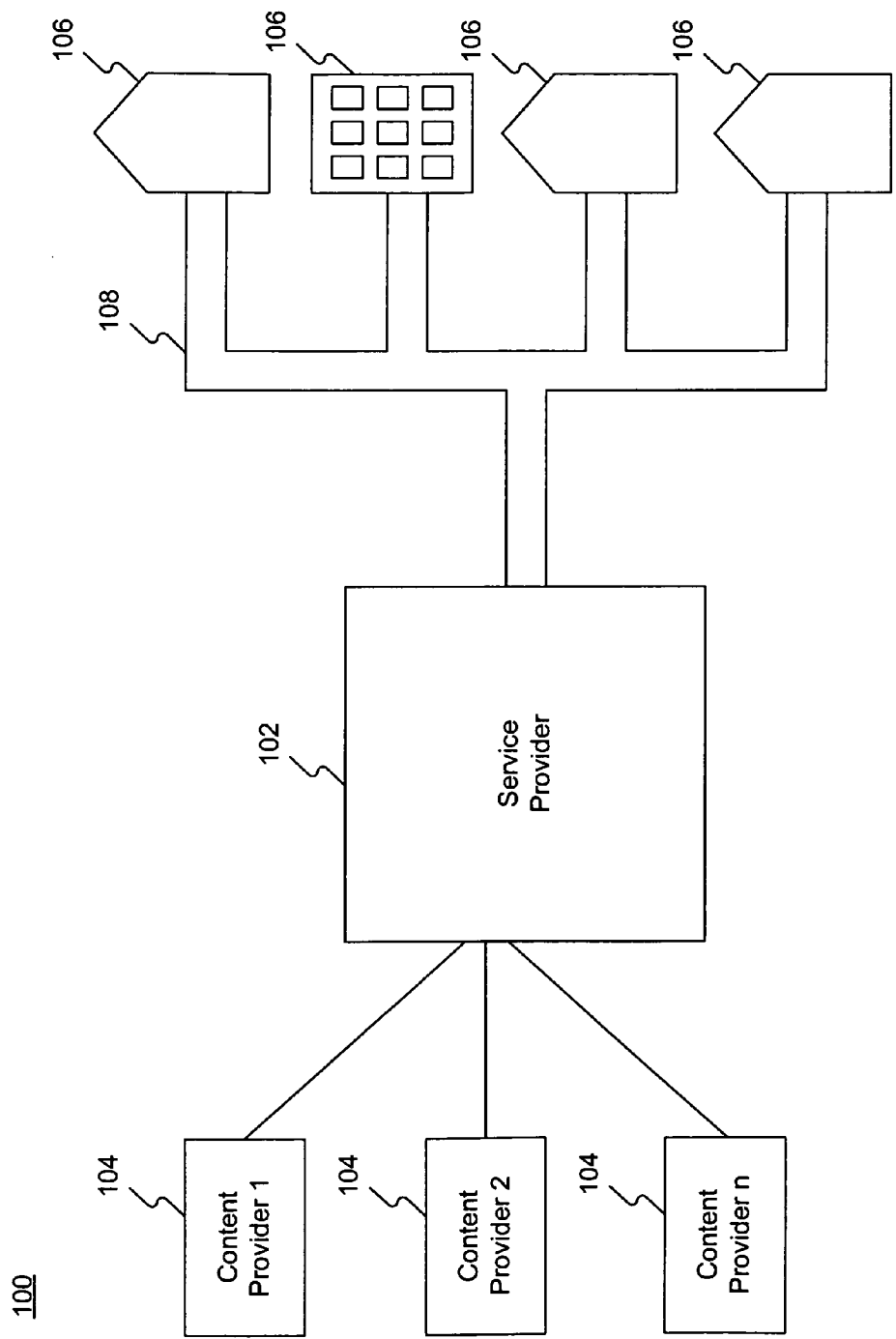
FIG. 1 is a block diagram of a system consistent with an embodiment of the present invention.

FIG. 1 is a block diagram of a system 100 consistent with a preferred embodiment of the present invention. A service provider 102 collects content (e.g., broadcast video, broadcast audio, audio/video on demand, data content), from a plurality of content providers 104. Such content may include, for example, programming from local broadcast television channels, programming from national broadcast television content providers such as Home Box Office or ESPN, and educational programming such as distance learning broadcasts. Service provider 102 transmits data, including the audio/video content, to subscribers 106 via an access network 108. Subscribers 106 may include homes, businesses, hotels, etc. In the preferred embodiment, access network 108 consists mainly of fiber optic cables and connectors, enabling high speed, two-way communication between service provider 102 and subscribers 106. Access network 108 may also include other networking technologies, such as wireless networking. In one embodiment, service provider 102 and subscribers 106 may also be able to communicate via alternate networks that may interconnect the service provider 102 and subscribers 106, such as the Internet (not shown).

FIG. 2 is a block diagram of a service provider 102 consistent with the preferred embodiment of the present invention. Service provider 102 may provide multiple services to subscribers 106. For example, service provider 102 may establish and maintain subscriber accounts, provide regular broadcast television programming, provide on-demand video content, enable subscriber feedback, etc. Service provider 102 may also enable subscribers 106 to obtain enhanced services, such as described below.

Exemplary service provider 102 may include various systems and facilities to receive, store, process and transmit content for provision to subscribers 106. For example, exemplary service provider 102 may include a television content system 202, an enhanced television services system 204, a distribution system 206, a subscriber database 208, a portal 210, and an authentication system 212. Television content system 202 may receive, store, process and transmit broadcast television content originated by content providers 104. In one embodiment, service provider 102 may also create television content and store and transmit such content using television content system 202. Enhanced television services system 204 may receive, store, process and transmit data to support enhanced television services and provide subscriber interfaces for accessing enhanced television services (as further discussed below).

Distribution system 206 may distribute content and data, e.g., from television content system 202 or enhanced television services system 204, to subscribers 106. Distribution system 206 may perform broadcast/multicast delivery (e.g., to send the same information to many subscribers simultaneously) or unicast delivery (e.g., to send customized content to a single subscriber). Distribution system 206 may also provide an "upstream" communications path from subscribers 106 to, for example, enhanced television services system 204, such that subscribers may send requests and other information related to obtaining customized content, among other things.

Subscriber database 208 may store data about subscribers 106 such as name, address, subscriptions to enhanced services, etc. Portal 210 may provide an interface for communications with service provider 102 via an external network, such as the public switched telephone network (PSTN) or a wide area network such as the Internet. Authentication system 212 may process authentication and/or authorization information to enforce security and privacy for providing services to subscribers 106.

A skilled artisan will recognize that service provider 102 may include more or fewer components than are shown in FIG. 2, and more or combined functionality compared to that illustrated in FIG. 2. For example, a separate database may be provided to store authentication information used by authentication system 212. In another example, service provider 102 may include telecommunications and/or conference bridge facilities to enable subscribers 106 to access audio/video telecommunications and/or teleconference services (e.g., available through enhanced television services). Additionally, the functionality of service provider 102 may be performed by a single system, or by a combination of computers and other equipment, which may be distributed over multiple locations and interconnected by various communications links. The operation of the components of service provider 102 is described in greater detail below.

Figure 3A:
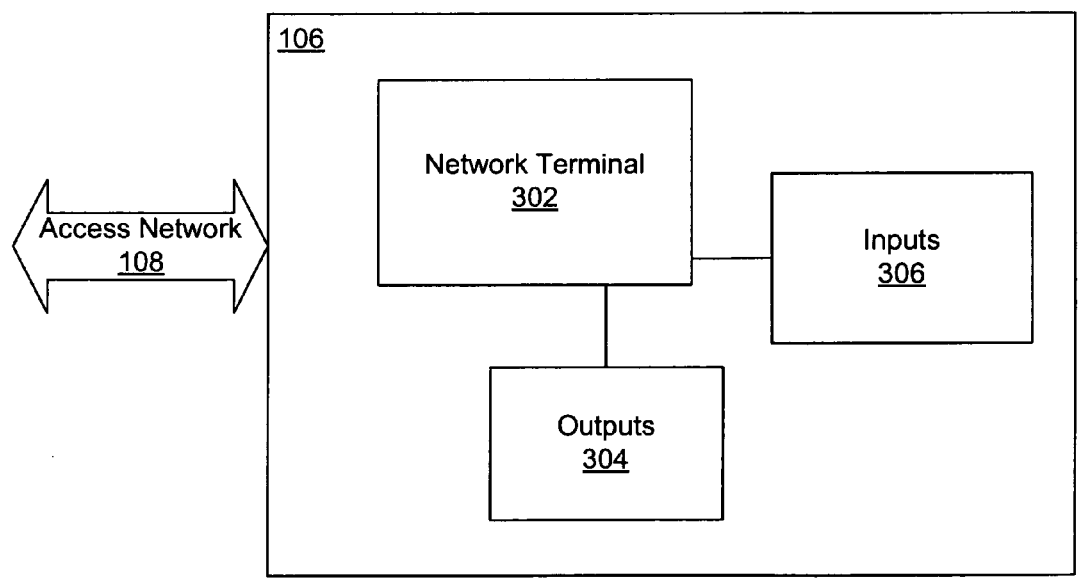
Figure 3B:
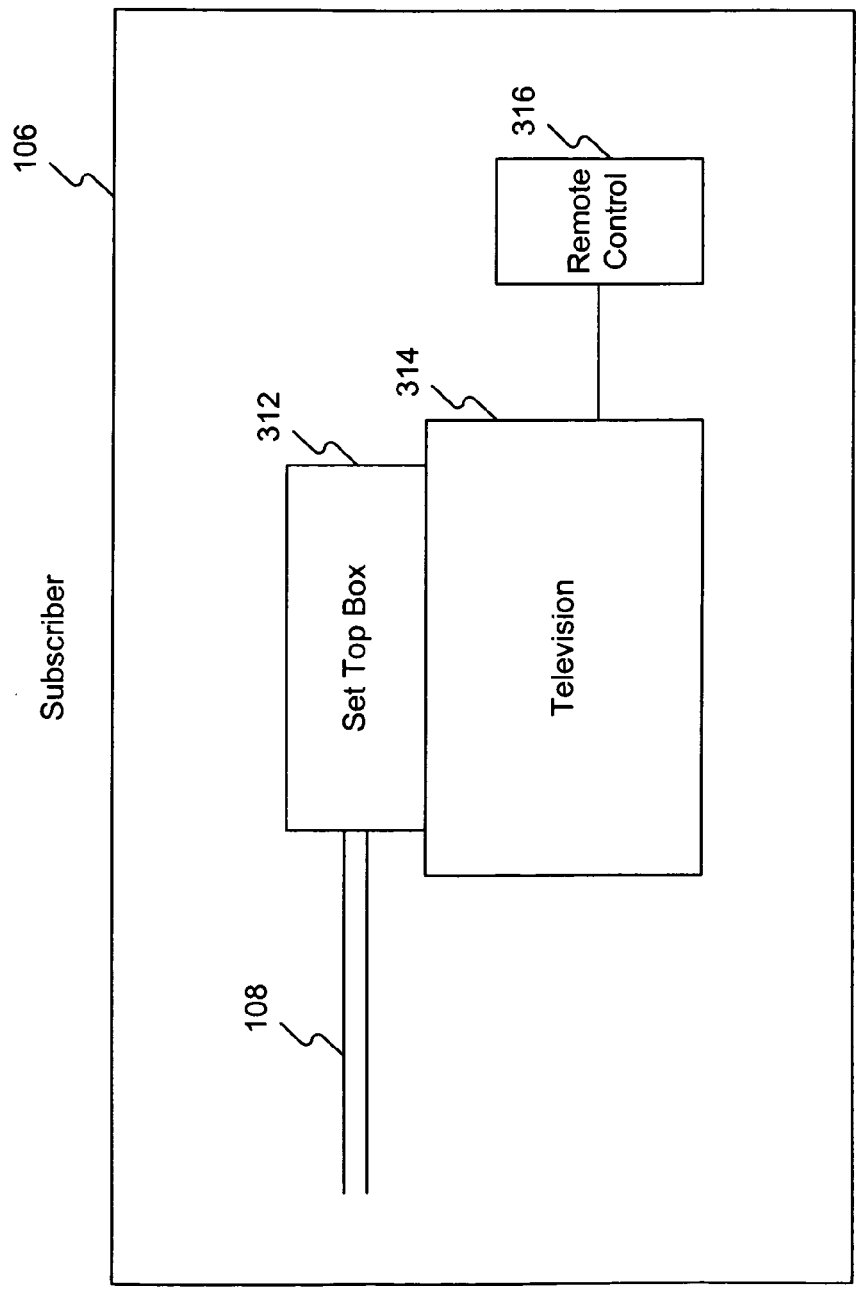

FIGS. 3(a) and 3(b) illustrate block diagrams of a subscriber 106 consistent with a preferred embodiment of the present invention. As shown in FIG. 3(a), subscriber 106 receives transmissions from service provider 102 via access network 108 at a network terminal 302. As described above, access network 108 may be, for example, a passive optical network (PON). The network terminal 302 may receive the network transmissions from service provider 102 via any number of intermediate components/technologies. For example, an optical-to-electrical conversion component may be interposed between the network terminal 302 and service provider 102 in order to convert optical transmissions to electrical signals (e.g., RF signals, POTS signals, Ethernet signals), as well as other transport components that may be deployed therebetween.

Network terminal 302 processes data received via access network 108 and presents it to output devices 304. As such, network terminal 302 may include processors, storage systems, network interfaces (e.g., to access network 108) and device interfaces, as generally known. Output devices 304 can include any number of components with the capabilities to output audio and/or video, such as video displays, speakers, television sets, etc. Network terminal 302 is also connected to one or more input devices 306, which allow users to provide input data, for example, to control the network terminal 302 or output devices 304, or provide data for upstream transmission over access network 108. Input devices 306 can include devices such as keyboards, pointing devices, remote controllers, touch screens, etc. In certain embodiments, network terminal 302 may be integrated with any or all of the output devices 304, as well as any or all of the input devices 306 (an example of which would be a mobile telephone). In some embodiments, subscriber 106 may also use a separate computing system or telecommunications device such as a telephone (not shown) connected to an external network (e.g., PSTN, Internet, wireless network) to communicate with service provider 102 (e.g., via portal 210).

FIG. 3(b) illustrates a specific embodiment relative to typical television service at a subscriber 106. As shown in FIG.

3(b), the network terminal is a set top box 312 connected to access network 108 (e.g., via various technologies/components) to communicate with service provider 102. Set top box 312 is connected to television 314, which includes facilities to display video and produce audio based on signals provided by set-top box 312. A remote control 316 and other input devices (e.g., pushbuttons) are provided and may be communicatively connected to television 314 and/or set-top box 312 (e.g., wirelessly) to enable a viewer to control television 314 and/or set top box 312, and to provide data which may be transmitted over access network 108 to service provider 102, and/or other subscribers 106.

Subscriber 106 may set up an account with service provider 102 which enables and/or controls the ability to receive enhanced television services. For example, the subscriber account may be used by provider 102 to store subscriber identification information, such as a name and address, store indications of which services a subscriber is authorized to receive, such as premium broadcast channels or Internet access, and track and bill for enhanced services, such as viewing of personalized content, etc. The account may also store an identifier of the subscriber's network terminal 302 that allows for identification of the network terminal over the access network 108 (e.g., a unique identifier of a set top box 312 assigned to the subscriber), facilitating the delivery of enhanced television services to the subscriber. Subscriber 106 may access account information, for example, using portal 210 via voice communications (e.g., an interactive voice response system) or data communications (e.g., an interactive web interface over the Internet). Alternatively, a subscriber may use a phone integrated into set top box 312 or controls available in remote control 316 to communicate with service provider 102 over access network 108.

Subscriber 106 may include several users. For example, within a single household, different family members may desire to receive different content or subscribe to different enhanced television services from service provider 102. In one embodiment, a subscriber 106 (e.g., a household) may establish an account with service provider 102 and each user (e.g., family members in the household) is associated with that account and may have information stored in subscriber database 208. In another embodiment, each user may establish his own account with service provider 102.

FIG. 4 is a detailed block diagram of a preferred network terminal 302 (such as set top box 312). Network terminal 302 may include an access network interface 402, control system 408, storage system 410 and device interface 412. Control system 408 may include processors or other control logic, which may be used to execute various instructions and manipulate data stored in storage system 410. Storage system 410 may include various storage devices and controllers, such as semiconductor memories (e.g. RAM, ROM, flash), magnetic memories (e.g., disk), optical memories (e.g., DVDs), memory controllers and/or other storage, as is well known. Device interfaces 412 may include various components to interface with external components, such as output devices 304 and input devices 306, as generally known.

Using the access network interface 402, network terminal 302 communicates with service provider 102 to send and receive high speed communications for television programming, enhanced television services, subscriber account management, etc., over access network 108. Access network interface 402 may include various components to allow for communications over access network 108 in one or more forms, depending on the implementation. For example, access network interface 108 may include an RF interface to receive RF signals and/or an optical interface to receive optical signals. Access network interface 402 may further include components to distinguish between and process various communications carried over access network 108. For example, access network interface 402 may include components to receive broadcast-television-formatted transmissions (e.g., NTSC, MPEG) and/or packet-data-formatted transmissions (e.g., Ethernet, IP). In some embodiments, access network interface 402 may also be connected to device interface 412, for example, to provide broadcast television transmissions to output devices 304.

Storage system 410 may include various modules executable by the control system 408 and implementing various features in the preferred embodiment. For example, storage system 410 stores a user interface 404 comprising one or more displays (e.g., an interactive program guide) which may be provided on output devices 304 to enable subscriber 106 to communicate with network terminal 302, select content for viewing, access enhanced viewing features, etc. User interface 404 may include various user interfaces to utilize enhanced television services available through service provider 102, for example, downloaded from service provider 102. Subscriber data 406 may also be stored in storage system 410 to support enhanced television services. For example, a subscriber's viewing preferences or settings may be stored as subscriber data 406. In another example, subscriber data 406 may be stored outside network terminal 302, such as at service provider 102 (e.g., in subscriber database 208) or on a computing system or other device controlled by the subscriber (e.g., a smart card).

Network terminal 302 may include fewer or more components than are shown in FIG. 4, as is well known, and may be interconnected in various ways using buses, etc., as is well known.

B. Enhanced Television Services

The preferred embodiment uses a high-bandwidth bi-directional access network 108 to provide enhanced television services. For example, a service provider may provide a multitude of enhanced services to a subscriber by allowing the subscriber to connect with the service provider via such a high-bandwidth bi-directional access network to obtain, configure and control the delivery of desired television content and related services. A preferred embodiment utilizes a fiber optic access network, although other high-bandwidth technologies could also be used (e.g., RF wireless, RF over coaxial cables). Fiber optic connections provide much more bandwidth for transmitting data than conventional connections using radio waves or coaxial cable. Fiber, for example, can easily carry hundreds or even thousands of channels of television content, telephone services, and data services (e.g., Internet access). To leverage the additional bandwidth and quality of fiber connections, service providers may offer a wide range of enhanced television services to attract and retain subscribers.

Enhanced television services may include, for example, personalized television channels, synchronized sharing of personal content among subscribers, direct access to supplemental television content, integrated chat and presence information on television, and interactive entertainment. Subscribers may enjoy these services from their premises using familiar devices (e.g., a set-top box, a television, a remote control, etc.). In some embodiments, subscribers may have the option of using a computer or other device connected to the Internet to further customize or enhance television services.

C. Personal Channel via Television

One enhanced television service that may be implemented in the preferred embodiment is a "personal channel via television" service. This service enables subscribers to provide access to personal content, such as home videos or subscriber-made feature films, to viewers of enhanced television services. The personal channel service enables a service subscriber to act as a program manager of a television station, setting the time and availability of personal content, or allowing other subscribers to select from available personal content for display at any time. By using the high bandwidth bi-directional access network 108 and televisions, subscribers can enjoy viewing a variety of personal content on a television in the comfort of a subscriber's living room, a service that is impractical in conventional television or video on demand systems. Using familiar devices like televisions and remote controls also makes viewing of personal content possible without the need to send videotapes or DVDs to those lacking a computer or specialized software.

While community service television may allow a content producer to broadcast personal content to other viewers of television, such services are limited in the amount of time allocated to any one broadcaster of personal content on any one channel. Further, time slots must be shared among a large number of service subscribers and a subscriber may or may not be able to gain access to a time slot for broadcasting. In contrast, the personal channel service described herein allows a subscriber to maintain a unique television channel where all time slots may be filled with the subscriber's content. The subscriber may choose to broadcast any content at any time without the need to wait for access to an available time slot. The personal channel service also allows personal content to be made available for selection at any time by a viewer without scheduling a specific broadcast time. Video on demand services typically offer the ability to select content for viewing at any time, however, such services provide mainstream, previously screened content controlled and selected by the service provider, and do not allow subscribers to broadcast personal content.

In one example, a subscriber desiring to establish a personal channel (referred to as a "broadcaster") logs in to the service provider and sets up a personal channel with the service provider. The system 204 receiving the request to create the personal channel authenticates the broadcaster and then assigns a personal channel identifier to the broadcaster. This identifier will allow viewers to tune a set top box to the personal channel. The identifier may be, for example, a television channel number. The broadcaster next sends personal content, such as a newly recorded music video, to the service provider together with a list of authorized viewers for that personal content. Alternatively, the broadcaster may specify that the personal content is to be available for viewing by all subscribers. The service provider authenticates the broadcaster and/or authorized viewers, stores the personal content, and makes the content available as specified by the broadcaster.

If the broadcaster has specified a particular time for broadcasting the content, the service provider retrieves the personal content at the specified time and sends it to those set top boxes 312 currently tuned to the assigned personal channel identifier. For example, a viewer could tune in at 8:00 PM to view a broadcast of the new music video recorded by the broadcaster's band. By tuning a set top box to the broadcaster's channel, authorized viewers may view the personal content seamlessly as though the content were broadcast from any major network television station, a feature not possible in current television systems. It should be noted that, "viewing personal content" refers to a viewer monitoring or experiencing all available sensory aspects of a personal content broadcast (e.g., video, audio).

In another embodiment, service provider 102 may provide one or more templates (e.g., predefined arrangements used for organizing and displaying available personal content) and allow a subscriber to choose which of the templates should be used for displaying a subscriber's available personal content. Once the personal content is arranged and displayed, a viewer may then select desired personal content for viewing at any time.

FIGS. 5-8 illustrate an exemplary implementation of a personal channel service consistent with the preferred embodiment of the present invention. This exemplary implementation is in the context of a fiber optic access network 108 connected to a network terminal 302 which is implemented as a set-top box 312 and connected to a television 314 and remote control 316. Other operating environments are possible, as noted above.

FIG. 5 is a flow chart of an exemplary method for providing a personal channel service to subscribers. A subscriber/broadcaster 106 may request access to the personal channel service (step 502). For example, the subscriber 106 may access the personal channel service through the user interface 404 presented by set top box 312. On selecting the personal channel service from the user interface 404, a request may be sent from set top box 312 to the service provider 102 to access the facilities of the personal channel service. Alternatively, a broadcaster may be able to access the personal channel service using a personal computer attached to the Internet, via portal 210. In such a case, service provider 102 may provide a facility to enable such access (e.g., a URL and an interface such as a web page).

To access enhanced television services, a broadcaster may first be required to be authenticated/authorized by service provider 102. In one embodiment, the broadcaster may have an existing account with service provider 102 and may receive television content via set top box 312 and television 314. In this example, the broadcaster may log in by submitting a login name and password to access his account with service provider 102. Alternatively, the set top box 312 may send identification information to the service provider (e.g., on initial network access), and the service provider may determine that the set top box 312 is associated with the subscriber and that access is authorized.

Once the broadcaster is authenticated/authorized, service provider 102 may determine whether a personal channel has been previously created by the broadcaster 106 (step 504). If a personal channel has not previously been created by the broadcaster, the broadcaster may create a personal channel and will be assigned a personal channel identifier (step 506). This identifier will allow other viewers to tune their set top boxes to the broadcaster's personal channel. Following creation of the personal channel (or if the personal channel was previously created), the broadcaster may specify certain personal channel information related to the personal channel, such as selecting a template for displaying personal content, providing search terms for the personal channel, or electing to show content at predetermined times, thereby mimicking the content availability of a network television station (step 508). Template and option selection is discussed in greater detail below with reference to FIG. 6.

Once the broadcaster has created a personal channel and specified various related information, the broadcaster may connect an input device to a device capable of accepting personal content, or otherwise specify a location from which to receive personal content (step 510). In one embodiment, the broadcaster may connect an input device such as a video camera, USB memory card, scanner, etc., to a personal computer enabled to accept personal content. Personal content may include, for example, photographs, video, graphics, etc. In another embodiment, the broadcaster may connect the input device to the subscriber's set top box 312 using device interfaces such as a USB connection or IEEE 1394 fire-wire connection, to receive digital photos or video directly from a digital camera or personal camcorder.

Next, the broadcaster may transmit the personal content to service provider 102 for storage and future broadcasting (step 512). The broadcaster may also include other content-specific information, such as a list of one or more viewers authorized to view the content (e.g., an access control list), a rating associated with the personal content (e.g., PG-13, R), a time (e.g., at 8:00 p.m. every night) for broadcasting, whether the personal content may be recorded by a viewer, etc. In one embodiment, the broadcaster may send personal content and other content-specific information to service provider 102 via portal 210 using a computer connected to the Internet. The broadcaster may upload personal content to a service provider data store, and the service provider may provide functionality that enables the broadcaster to organize and edit the personal content. For example, the service provider may provide tools for selecting, organizing, and adding content to the selected template for viewing.

Alternatively, the broadcaster may send personal content and other content-specific information to service provider 102 via set top box 312. Set top box 312 may store the personal content with subscriber data 406 at set-top box 312, and/or send the personal content to service provider 102 for storage via access network 108. Using a series of user interfaces provided to set top box 312 and displayed on television 314, service provider 102 may enable the broadcaster to specify certain content-specific information, such as a list of one or more authorized viewers, a time for broadcasting the content, whether the content is recordable, etc., as noted above. The user interfaces may also provide access to the organization and editing facilities noted above. Set top box 312 may also have access to a stored address book of subscribers associated with the broadcaster (e.g., stored in subscriber data 406 or in subscriber database 208). The contents of the address book may be displayed on television 314 and the broadcaster may use buttons on remote control 316 to scroll through the address book entries to select authorized viewers for personal content available on the personal channel. In some embodiments, because service provider 102 assigns set top boxes to its users, service provider 102 is able to ensure that personal content is securely shared with only the viewers specified by the broadcaster.

Following the transmission of personal content and other content-specific information to the service provider, one or more viewers, which may include the broadcaster, may tune their set top box 312 to the broadcaster's personal channel to view the available personal content (step 514). A viewer may have access to the broadcaster's personal channel from the user interface 404 of set-top box 312 (e.g., using an interactive program guide) or may tune the set top box 312 to the broadcaster's personal channel directly. Further, the broadcaster may have elected to broadcast the personal content only at specific times and a viewer may tune the set top box 312 to the broadcaster's personal channel at the specified time to view the broadcaster's personal content. Alternatively, personal content may be available to a viewer of the personal channel on demand. In such an example, the broadcaster may configure the personal channel to allow the viewer to select personal content for viewing from all available content displayed in a template any time the set top box 312 is tuned to the broadcaster's personal channel. An example of processing associated with a viewer request for personal content, e.g., tuning a set top box 312 to an assigned personal channel identifier, is discussed in greater detail below referencing FIG. 7.

FIG. 8 illustrates an exemplary implementation of the personal channel service. In the preferred embodiment, the personal channel service is implemented in enhanced television services system 204. In other embodiments, the personal channel service may be implemented in other environments (e.g., a third party service provider) which may be accessible through service provider 102. Enhanced television services system 204 may include facilities configured to implement various features of the system, for example, a control system 1602, a broadcaster data store 1604, a user interface facility 1606 and a network interface 1608. Control system 1602 may execute the methods and processes used to implement the features of the personal channel service as described herein, and may be implemented in one or more of software, hardware and firmware, using known processing systems, storage systems and interfacing systems, as is generally known. Broadcaster data store 1604 provides a storage location for personal channel data, such as the actual content data, a channel identifier, a channel name, search terms, access control lists, ratings, recording controls, templates, etc., and may be accessible by control system 1602. Broadcaster data store 1604 may be within system 204 (e.g., within control system 1602), or may be external to system 204 but accessible by system 204 (e.g., via network interface 1608).

User interface facility 1606 provides one or more user interfaces to permit a user to configure, control and view personal channel information. User interfaces may be implemented using known technologies, such as HTML or Java, and may be implemented as one or more modules that may be (completely or partially) downloaded to a subscriber's network terminal. Network interface 1608 provides an interface between enhanced television services system 204 and other components available via service provider 102. For example, a network interface 1608 may include an interface to distribution system 206 to permit the receipt/transmission of personal channel information and controls (e.g., user interfaces, subscriber commands/messages, content displays) over access network 108. Network interface 1608 may include interfaces to subscriber database 208 allowing for the retrieval of subscriber information stored therein and authentication system 212 allowing for authorization and authentication operations. Other interfaces may also be supported as desired (e.g., to portal 210 and television content system 202).

System 204 may be implemented using more or fewer components that illustrated in FIG. 8. For example, various components may be combined into single hardware and/or software implementations, or may be distributed over multiple interconnected hardware and/or software implementations. Such implementation choices are well known.

FIG. 6 is a flow chart depicting a method to set up and manage a personal channel via television. To access this enhanced television service, service provider 102 receives a request to access the personal channel service from a broadcaster, such as a subscriber 106 wishing to broadcast personal content to subscribers of enhanced televisions services, and service provider 102 obtains login data associated with the broadcaster (step 602). Service provider 102 may use authentication system 212 to authenticate the login data. For example, authentication system 212 may compare the login data to information stored in subscriber database 208 to determine whether the broadcaster is a valid subscriber. Authentication may also be based on set-top box identification information provided by set top box 312 (e.g., when first connected to access network 108), which may be used by authentication system 212 to determine whether the subscriber is authorized to access service provider services, such as the personal channel service.

Once the broadcaster is authenticated/authorized, system 204 determines whether the broadcaster has previously created a personal channel within the system (step 604). If not, system 204 prompts the broadcaster to submit information which may be necessary for creation of a personal channel (step 606), such as whether the personal channel should be available via an interactive program guide provided through user interface 404, search terms associated with the personal channel, etc. In one embodiment, system 204 may create a personal channel by assigning a storage location within broadcaster data store 1604 for storage of personal channel information and content-specific data associated with the personal channel. System 204 may then assign a personal channel identifier, linked to the storage location, for the broadcaster's personal channel. In this example, the personal channel identifier may be mapped to an address or other locator used for broadcasting personal content through the system. Further, the personal channel identifier may be, for example, a simple number, a broadcaster's unique network address (e.g., a phone number), or other easily remembered symbol. The personal channel identifier may be used by other subscribers to tune a set top box 312 to the broadcaster's personal channel for viewing personal content. The personal channel identifier may be stored as part of the personal channel information, allowing for a search operation based on the personal channel identifier.

Once the personal channel has been created, system 204 may provide a facility to specify various personal channel information related to the personal channel (step 608). In order to collect personal channel information, system 204 may provide one or more user interfaces from user interface facility 1606 to set top box 312 over access network 108. These user interfaces may be displayed by set top box 312 to prompt a broadcaster to enter personal channel information such as a channel name, search terms for the personal channel, electing to show content at predetermined times (mimicking the content availability of a network television station), allowing the channel to be viewable/searchable in a program guide, and selecting a template for displaying personal content. Such personal channel information may be collected by set top box 312 (e.g., using remote 316), and stored locally in subscriber data 406 (for possible later transmission to system 204). Alternatively, such personal channel information may be immediately transmitted by set top box 312 over access network 108 as one or more messages, received at system 204 and stored in broadcaster data store 1604 in association with the personal channel.

The service provider may also receive from the broadcaster content-specific data such as the personal content, a list of one or more authorized viewers of the personal content, a rating for the content (e.g., PG-13, R), and a broadcast time for the content (step 610). Service provider 102 and the broadcaster may communicate, for example, using set top box 312 via access network 108, or using a personal computer via the Internet (e.g., using portal 210). System 204 may provide one or more user interfaces to prompt the broadcaster for such content-specific data. Where subscriber 106 can access facilities of the service provider for organizing and editing personal content, subscriber 106 can use the interfaces provided to perform such operations on the personal content (e.g., reordering personal content, performing video/audio editing). Such content-specific information may be collected by set top box 312 (e.g., using remote 316), and stored locally in subscriber data 406 (for possible later transmission to system 204). Alternatively, such content-specific information may be immediately transmitted by set top box 312 over access network 108 as one or more messages, received at system 204 and stored in broadcaster data store 1604 in association with the personal channel.

In one embodiment, the broadcaster may preview the personal channel information and/or content-specific information prior to completion of the personal channel set-up (step 611). The broadcaster may preview such things as how the available content looks in a specified template, a program guide entry showing descriptions and broadcast times for particular content, etc.

Upon completion of personal channel set-up activities, the broadcaster may save the personal channel information and content-specific information (step 612). For example, where the personal channel information and content-specific information have been stored locally at set top box 312, the set top box 312 may transmit such information to system 204 for storage, for example, in broadcaster data store 1604 in association with the personal channel. When the personal channel information and content-specific information are already stored in broadcaster data store 1604, this operation may merely end the broadcaster's access to such information, making the information available for use as part of the personal channel service.

FIG. 7 provides a flow chart of an exemplary method to obtain access to personal content from a broadcaster's personal channel. Initially, system 204 may provide various program guide entry information for inclusion in program guide data sent to set top boxes 312 attached to access network 108 (not shown). Where broadcasters have configured their personal channels to be visible in a program guide offered by the service provider (e.g., as stored as part of personal channel information associated with the personal channel), program guide entries for these personal channels will be provided to program guide facilities of service provider 102 (which may also be part of system 204, or provided by a content provider 104). Such program guide entry information may include the channel identifier, a title of personal content, the start and end times of content availability, and other descriptive information (e.g., ratings, search terms). Program guide information may be provided to set top boxes 312 on a periodic basis, and usable in user interfaces 404 to display program guides at set top boxes 312.

A viewer may attempt to access the broadcaster's personal channel (step 702). For example, the view may tune a set top box 312 to the broadcaster's personal channel via entering the personal channel identifier associated with the personal channel. A broadcaster may configure a personal channel such that viewers are required to know the assigned personal channel identifier in order to access the broadcaster's personal channel (e.g., by preventing the personal channel from being presented in a program guide). Alternatively, a viewer may be able to locate a personal channel via an interactive program guide provided by user interface 404. Locating a personal channel from the interactive program guide may be done, for example, by browsing the interactive program guide or by searching key words within the interactive program guide. Once a viewer has knowledge of the assigned personal channel identifier, whether through the interactive program guide or another method, the viewer may tune the set top box 312 to the assigned personal channel identifier, thereby requesting access to the broadcaster's personal content. The request for the personal channel may be transmitted over access network 108 to service provider 102 and system 204.

Service provider 102 may authenticate each set top box making a request to access the personal channels service.

Authentication may include determining if the viewer subscribes to enhanced television services and the personal channels service in particular (step 704). Service provider 102 may authenticate a viewer, for example, by authenticating the set top box 312 making the access request, via a unique identifier associated with the set top box 312 and transmitted by the set top box 312 with the access request, or may utilize other means for determining the identity or location of the set top box 312. In some embodiments, personal channels may be available to viewers without authentication.

Where a broadcaster has specified an access control list associated with the personal channel and/or the content available from the personal channel, an individual viewer tuning in to the broadcaster's personal channel may require authentication by service provider 102 in order to view a broadcaster's personal content (step 706). This may include, for example, determining an identity of each authorized viewer (e.g., using information in subscriber database 208) and determining whether the viewer has been authorized by the broadcaster to view personal content, for example, by referencing the access control list associated with the content, by determining whether the viewer meets the requirements to view the content based on the content rating, etc. Determining the identity of the viewer may be performed similar to the prior service authorization step, or may be a separate authentication (e.g., using a separate login/password). Such authentication may be useful for preventing viewers with access to an authenticated set top box from accessing content inappropriate for all viewers.

Once a requesting set top box and associated viewer have been authenticated (if necessary), service provider 102 may allow the viewer access to the broadcaster's personal channel. System 204 determines whether the broadcaster has configured the personal channel to provide personal content on a schedule, or for viewing on demand (step 707). Where a broadcaster has configured a personal channel to allow personal content to be selected and viewed on demand, system 204 may provide certain personal channel information and content-specific information related to the personal channel and available personal content to set top box 312, which may then display this information in a user interface and allow a viewer to select content for viewing using the remote control 316 or other selection device (step 708). Such information could include the channel identifier, the titles of the available personal content, dates, run times, ratings, etc. The user interface may be based on a template selected by the broadcaster (and identified in personal channel information associated with the personal channel). For example, all content items may be displayed on the same screen, each as a miniature image derived from the personal content combined with an explanatory comment or designation accompanying the image. Alternatively, a larger picture or video representation derived from one personal content item may be visible singularly within the display. In such an example, the viewer may select the personal content currently represented on the display, or select to view a different personal content item's representation in an action similar to browsing through an interactive program guide, one item at a time.

Continuing with the case where the broadcaster has configured personal content to be available for on-demand viewing, upon selection by the user, set-top box 312 may send a message to system 204 over access network 108, indicating the selection. System 204 may receive the viewer's request for particular personal content (step 710), and locate the requested personal content in the broadcaster data store 1604. System 204 then transmits the personal content data to the requesting viewer's set top box 312 tuned to the assigned personal channel identifier (step 712). Transmission may be by various means (e.g., streaming, storable download) and in various formats, as are well known, and may be based on the personal channel information configured by the broadcaster. For example, where the broadcaster has indicated that the personal content is not to be copyable by the subscribers, the system 204 may provide the personal content in a streaming format. Where available (and permitted), set top box 312 may invoke recording facilities in order to locally store the personal content.

In an alternate embodiment, instead of storing personal content in broadcaster data store 1604, pointers to the selected personal content may be stored. In such a scenario, the personal content may be stored remotely, for example, in the broadcaster's set top box 312. System 204 may then use the pointers to locate the personal content stored remotely, confirm that the personal content is currently available, and then cause the personal content to be transmitted from the remote location (e.g., broadcaster's set top box 312) to the requesting viewer's set top box 312 via access network 108, or to viewer's PC via portal 210 and the Internet.

Where a broadcaster has configured the personal channel to broadcast specific content at a particular time and the viewer has tuned set top box 312 to the broadcaster's personal channel, the system 204 may determine the personal content that is to be provided during the time of the request (step 709), and then transmit the determined personal content to the viewer's set top box 312 (step 712). If the time for a broadcast has not yet arrived, system 204 may display a message indicating that personal content is scheduled to run at a particular time, display a schedule of future broadcasts, or display other personal content that is currently being displayed on the personal channel.

In one embodiment, control logic 1602 of system 204 continuously causes scheduled personal content to be transmitted over access network 108 using portions of access network (e.g., portions allocated to personal channel transmissions). These transmissions may be provided in an encrypted or otherwise obscured format, to prevent all set top boxes 312 from viewing the content. When the system 204 determines that the set-top box 312 is authorized to access a personal channel, it provides a decryption facility in order to allow the set top box to decrypt the personal channel transmissions being requested. In other embodiments, the scheduled personal content is selectively transmitted over access network 108 to those set top boxes 312 that have requested access to the personal content, for example, based on network identification of the authorized set top boxes 312.

Using methods and systems consistent with preferred embodiments described herein, a broadcaster may display personal creative works to anyone with access to enhanced television services via a television 314 and set top box 312 tuned to a specified channel, or other devices. Broadcasters may thus act as "program directors" of a personal television "station" by producing and scheduling content to be broadcast throughout the system, and may further limit viewing to a select group of individuals and be secure in the knowledge that multiple levels of authentication likely prevents unauthorized viewers from viewing the content. Further, enhanced television service subscribers are able to view a variety of content offerings not previously available over conventional TV or video on demand systems.

Other embodiments and modifications to the presently described preferred embodiments will be apparent to those skilled in the art from consideration of the specification and practice of the preferred embodiments disclosed above. For example, the personal channel service provider could partner with advertisers allowing broadcasters who create frequently viewed content to share in revenue generated from advertisements run during a broadcaster's popular broadcasts. By using access network 108 and television displays, service provider 102 is able to provide accurate ratings data to such advertisers for evaluation. In another example, a record company may want to advertise and broadcast music videos of its up and coming artists in order to increase exposure, while also tracking the statistics of set top boxes tuned in to watch particular videos. In yet another example, a broadcaster may send out invitations via the enhanced television system announcing his personal channel and content available there. These invitations may be targeted to friends or relatives of the broadcaster, or may be directed to such groups that have expressed interest in viewing media of the type created by the broadcaster. These types of services are made possible by the ability to authenticate set top boxes prior to a viewer viewing a particular channel and to restrict the ability of a viewer to record the personal content.

It is intended that the specification and examples described herein be considered as exemplary only, with a true scope and spirit of the invention being indicated by the following claims.

We claim:

1. A method, comprising:
   receiving, at a control system, from a first network terminal of a broadcaster attached to a network, a request to create a personal channel;
   assigning a channel identifier to the personal channel;
   receiving, at the control system, personal channel information associated with the personal channel, the personal channel information including a template for organizing content displayed on the personal channel;
   receiving, at the control system, content-specific information associated with the personal channel, the content-specific information including personal content associated with the broadcaster;
   designating a location for storage of the received personal channel information and the received content-specific information, the designated storage location being associated with the channel identifier;
   receiving, from a second network terminal of a viewer, a request to view the personal channel, the request comprising at least the channel identifier;
   retrieving, in response to the request, the template and at least a portion of the content-specific information from the designated storage location using the received channel identifier; and
   transmitting, from the control system, the template and the content-specific information portion to the second network terminal over the network, the second network terminal being tuned to the channel identifier, and the second network terminal being configured to generate, in accordance with the template, a first interface comprising information that enables the viewer to access to at least a portion of the personal content associated with the personal channel.

2. The method of claim 1, wherein the second network terminal is a set top box.

3. The method of claim 1, further comprising:
   transmitting data associated with a second interface to the first network terminal; and
   accessing, by the broadcaster using the second interface, a preview of at least a portion of the personal content.

4. The method of claim 1, wherein the personal channel information further includes at least one of the channel identifier or a channel name.

5. The method of claim 1, wherein:
   the user interface is configured to display a list of available items of personal content associated with the personal channel; and
   the method further comprises:
      receiving, at the control system, from the second network terminal, a selection of at least one of the items of personal content from the list;
      retrieving the selected personal content item from the storage device; and
      transmitting the selected personal content item.

6. The method of claim 1, wherein the content-specific information includes at least one of a date and time for broadcasting of the at least one item of personal content, an indication whether the at least one item of personal content can be recorded, or a rating.

7. The method of claim 1, wherein the at least one item of personal content includes at least one of photographs, music, video, slides, educational material, or artwork.

8. The method of claim 1, wherein the content-specific information includes:
   a list of authorized viewers of the-personal content, and wherein the method further includes determining whether the second network terminal is authorized to receive the-personal content based on the list of authorized viewers.

9. A non-transitory, processor-readable medium storing instructions that, when executed by a processor, cause the processor to perform a method, comprising:
   receiving, at a control system, from a first network terminal of a broadcaster attached to a network, a request to create a personal channel;
   assigning a channel identifier to the personal channel;
   receiving, at the control system, personal channel information associated with the personal channel, the personal channel information including a template for organizing content displayed on the personal channel;
   receiving, at the control system, content-specific information associated with the personal channel, the content-specific information including personal content associated with the broadcaster;
   designating a location for storage of the received personal channel information and the received content-specific information, the designated storage location being associated with the channel identifier;
   receiving, from a second network terminal of a viewer, a request to view the personal channel, the request comprising at least the channel identifier;
   retrieving, in response to the request, the template and at least a portion of the content-specific information from the designated storage location using the received channel identifier; and
   transmitting, from the control system, the template and the content-specific information portion to the second network terminal over the network, the second network terminal being tuned to the channel identifier, and the second network terminal being configured to generate, in accordance with the template, a first interface comprising information that enables the viewer to access to at least a portion of the personal content associated with the personal channel.

10. A system, comprising:
   a network interface connected to a network, the network being connected to a first network terminal of a broadcaster and a second network terminal of a viewer;
   a broadcaster data store including personal channel information and content-specific information; and a control system connected to the network interface and the broadcaster data store, wherein the control system is configured to:
receive, from the first network terminal, a request to create a personal channel from the broadcaster;
assign a channel identifier to the personal channel;
receive personal channel information associated with the personal channel from the first network terminal, the personal channel information including a template for organizing content displayed on the personal channel;
receive content-specific information associated with the personal channel, the content-specific information including personal content associated with the broadcaster;
designate a location for storage of the received personal channel information and the received content-specific information, the designated storage location being associated with the channel identifier;
receive, from a second network terminal of a viewer, a request to view the personal channel, the request comprising at least the channel identifier;
retrieve, in response to the request, the template and at least a portion of the content-specific information from the designated storage location using the received channel identifier; and
transmit the template and the content-specific information portion to the second network terminal over the network, the second network terminal being tuned to the channel identifier, and the second network terminal being configured to generate, in accordance with the template, a first interface comprising information that enables the viewer to access to at least a portion of the personal content associated with the personal channel.

11. The system of claim 10, wherein at least one of the first network terminal and second network terminal is a set top box.

12. The system of claim 10, wherein the personal channel information includes at least one of the channel identifier or a channel name.

13. The system of claim 10, wherein the content-specific information includes at least one of a date and time for broadcasting of the at least one item of personal content, an indication whether the at least one item of personal content can be recorded, or a rating.

14. The system of claim 10, wherein the content-specific information includes a list of authorized viewers of the personal content, and wherein the control system is further configured to determine whether the second network terminal is authorized to receive the personal content based on the list of authorized viewers.

15. The system of claim 10, wherein:
the user interface is configured to display a list of available items of personal content associated with the personal channel; and
the control system is further configured to:
receive, from the second network terminal, a selection of at least one of the items of personal content from the list;
retrieve the selected personal content item from the storage device; and
transmit the selected personal content item.

16. The system of claim 10, wherein the second network terminal includes recording facilities and is configured to record at least a portion of the personal content.

17. A method, comprising:
receiving, at a control system, a viewer request over an access network to view a personal channel of a broadcaster, the request being associated with a channel identifier, wherein content-specific information associated with the personal channel is stored in a designated location associated with the channel identifier;
receiving, at the control system, security information from a viewer over the access network;
authenticating the security information received from the viewer;
retrieving, based on the authentication, a portion of the content-specific information and a template selected by a broadcaster of the personal channel from the designated storage location using channel identifier; and
transmitting the template and the content-specific information portion, from the control system via the access network and according to the channel identifier, to a device capable of displaying a user interface comprising information that enables the viewer to access at least a portion of personal content associated with the personal channel, wherein:
the device is configured to generate the user interface in accordance with the template.

18. The method of claim 17, wherein:
the user interface is configured to display a list of available personal content associated with the personal channel; and
the method further comprises:
receiving a viewer selection of personal content from the list of available personal content;
retrieving the personal content selection from the storage Device; and
transmitting the personal content selection to the device.

19. The method of claim 17, wherein the security information includes at least one of a unique identifier associated with a network terminal, a username, or a password.

20. The method of claim 17, wherein the access network is a fiber optic network.

* * * * *